US005121379A

United States Patent [19]
Funabashi et al.

[11] Patent Number: 5,121,379
[45] Date of Patent: Jun. 9, 1992

[54] DUAL SIDE DISC PLAYER HAVING SEPARATE CENTERING HUBS FOR EACH SIDE OF THE DISC

[75] Inventors: Tadashi Funabashi; Isami Kenmotsu, both of Saitama, Japan

[73] Assignee: Pioneer Electronic Corporation, Tokyo, Japan

[21] Appl. No.: 534,213

[22] Filed: Jun. 7, 1990

Related U.S. Application Data

[63] Continuation of Ser. No. 278,303, Nov. 30, 1988, abandoned.

[30] Foreign Application Priority Data

Nov. 30, 1987 [JP] Japan .................. 62-303506
Dec. 26, 1987 [JP] Japan .............. 62-198782[U]
Jan. 14, 1988 [JP] Japan ................ 63-3165[U]

[51] Int. Cl.⁵ .................. G11B 3/62; G11B 17/00
[52] U.S. Cl. .................. 369/270; 369/199; 369/195; 369/75.2
[58] Field of Search .......... 369/270, 271, 77.1, 369/77.2, 194, 199, 195, 75.1, 75.2; 360/99.04, 99.05

[56] References Cited

U.S. PATENT DOCUMENTS

| | | | |
|---|---|---|---|
| 4,539,670 | 9/1985 | Inaba et al. ............... | 369/77.1 |
| 4,541,086 | 9/1985 | Tanaka .................. | 369/270 |
| 4,566,087 | 1/1986 | Kraft .................... | 369/34 |
| 4,771,416 | 9/1988 | Ishibashi et al. ......... | 369/270 |
| 4,807,069 | 2/1989 | Okauchi et al. .......... | 369/270 |
| 4,841,517 | 6/1989 | Kurihara et al. ......... | 369/270 |
| 4,951,277 | 8/1990 | Masunaga et al. ........ | 369/270 |
| 4,982,399 | 1/1991 | Odawara et al. ......... | 369/270 |
| 5,050,159 | 9/1991 | Kenmotsu ............... | 369/270 |

FOREIGN PATENT DOCUMENTS

| | | |
|---|---|---|
| 0052454 | 5/1982 | European Pat. Off. . |
| 270684 | 12/1987 | European Pat. Off. . |
| 0270684 | 6/1988 | European Pat. Off. . |
| 0273734 | 7/1988 | European Pat. Off. . |
| 314394 | 5/1989 | European Pat. Off. . |
| 3429096 | 3/1985 | Fed. Rep. of Germany . |
| 2558002 | 1/1985 | France . |

OTHER PUBLICATIONS

Patent Abstracts of Japan, vol. 9, No. 109 (P-355) (1832), May 14, 1985; and JP-A-59 231 784 (Sony K. K.) 26-12-1984.
Patent Abstracts of Japan, vol. 5, No. 142, (P-79) [814], Sep. 8, 1981 & JPA 56 77953.
Patent Abstracts of Japan, vol. 7 No. 15, (P-169) [1160], Jan. 21, 1983 & JPA 57 169 936
Patent Abstracts of Japan, vol. 7, No. 6, (P-167) [1151], Jan. 11, 1983 & JPA 57 164 451.

*Primary Examiner*—Stuart S. Levy
*Assistant Examiner*—Joseph A. Rhoa
*Attorney, Agent, or Firm*—Sughrue, Mion, Zinn Macpeak & Seas

[57] ABSTRACT

A double-sided playing disc player is disclosed in which recorded signals are reproduced from a disc, on both faces of which signals are recorded, by a pickup disposed on the side of a turntable (4) or another pickup disposed on the side opposite to the turntable. The disc player comprises a first centering hub (6) mounted on the turntable, a clamping mechanism (11) for clamping the disc placed on the turntable, and a second centering hub (14) mounted on the clamper mechanism.

4 Claims, 12 Drawing Sheets

DUAL SIDE DISC PLAYER HAVING SEPARATE CENTERING HUBS FOR EACH SIDE OF THE DISC

This is a Continuation of application No. 07/278,303 filed Nov. 30, 1988 now abandoned.

BACKGROUND OF THE INVENTION

This invention relates to a disc player such as an optical video disc player.

Recently, it has been proposed to reproduce signals on both faces of an optical video disc without reversing it on a turntable. FIG. 1 shows the construction of such a player. A disc 1 is placed on a turntable 4. When a spindle motor 2 is energized, a spindle 3 and hence the turntable 4 are rotated together with the disc 1. A pickup 5A is disposed on the side of the turntable 4 when the face A of the disc 1 is to be reproduced, and another pickup 5B is disposed on the side opposite to the turntable 4 when the face B is to be reproduced.

In any case, the disc has been centered as shown in FIG. 2. More specifically, a centering hub 6 is mounted at the inner periphery of the turntable 4. The centering hub 6 is urged upwardly in the Figure by a spring 7. Numeral 8 denotes a ring for preventing the separation of the centering hub 6 urged by the spring 7.

When the disc 1 is placed on the turntable 4, a tapered surface of the outer periphery of the centering hub 6 is engaged with an edge of a center hole of the disc 1, so that the disc 1 is centered in such a manner that the center of the center hole is brought into alignment with the center of rotation of the spindle 3.

Thus, in the conventional player, in the case where the pickup disposed on either side is to be used, the disc 1 is centered by the centering hub 6 mounted on the turntable 4. However, since the optical video side is formed into one disc capable of double-faced reproduction by bonding together two discs each having signals recorded on its one face, center holes of the bonded two discs do not always coincide with each other accurately. Therefore, even if the centering is effected by the centering hub 6, the center of the center hole of the disc on the side opposite to the turntable 4 (upper side) is not in alignment with the center of rotation of the spindle 3. As a result, when the signals are to be reproduced by the pickup 5B disposed on the side opposite to the turntable 4, the eccentricity of the disc becomes greater, and in the worst case, a tracking servo is liable to become disabled, and the reproduction has sometimes virtually been impossible.

SUMMARY OF THE INVENTION

The present invention has been made in view of such a situation, and aims at enabling a positive reproduction even by the pickup disposed on the side opposite to the turntable.

A disc player according to the present invention is a disc player wherein recorded signals are reproduced from a disc, on both faces of which signals are recorded, by a pickup disposed on the side of a turntable or by the pickup disposed on the side opposite to the turntable, characterized by the provision of a first centering hub mounted on the turntable; a clamper for clamping the disc placed on the turntable; and a second centering hub mounted on the clamper.

Signals are recorded on both faces of the disc. The disc is placed on the turntable and is clamped by the clamper. When the signals on the face on the turntable side are to be reproduced, the pickup disposed on the turntable side is used, and when the signals on the opposite face are to be reproduced, the pickup disposed on the side opposite to the turntable is used. The disc is centered by the first centering hub mounted on the turntable when the signals on the face on the turntable side are to be reproduced, and is centered by the centering hub mounted on the clamper when the signals on the opposite face are to be reproduced.

Therefore, even when the pickup is disposed on either side, eccentricity can be reduced.

According to another aspect of the present invention, recorded signals are reproduced from a disc, on both faces of which signals are recorded, by a pickup disposed on the side of a turntable or by said pickup disposed on the side opposite to said turntable, characterized by the provision of a first centering means disposed on the side of said turntable for centering one face of said disc; a second centering means disposed on the side opposite to said turntable for centering the other face of said disc; and a drive means for driving said second centering means making use of the rotation of said turntable.

The disc is centered by the first centering means when the face on the side of the turntable is to be reproduced. On the other hand, the disc is centered by the second centering means when the face on the side opposite to the turntable is to be reproduced. The drive means drives the second centering means, making use of the rotation of the turntable.

Therefore, there is no need for a special drive source for driving the second centering means.

A double-sided player disc player according to still another aspect of the present invention is characterized in that guide and drive means for guiding and driving a carriage, which carries pickup means, to move it along both recording surfaces of a disc comprises first and second guide members disposed in such a manner that the disc is interposed therebetween, and disposed to detachably support the carriage at predetermined attachment/detachment positions; a holder member for holding the carriage at predetermined attachment/detachment positions; an inverting mechanism for moving the holder member from one of the attachment/detachment positions of the first and second guide members to the other along a plane intersecting the directions of guiding by the guide members; and drive means for moving the carriage on the first and second guide members and for driving the inverting mechanism so as to move the holder member.

A double-sided player disc player according to the present invention is characterized in that guide and drive means for guiding and driving a carriage, which carries pickup means, to move it along both recording surfaces of a disc comprises first and second guide members disposed in such a manner that the disc is interposed therebetween, and disposed to detachably support the carriage at predetermined attachment/detachment positions; a holder member for holding the carriage at predetermined attachment/detachment positions; an inverting mechanism for moving the holder member from one of the attachment/detachment positions of the first and second guide members to the other along a plane intersecting the directions of guiding by the guide members; and drive means for moving the carriage on the first and second guide members and for driving the inverting mechanism so as to move the holder member; the drive means comprising a spring member which is engageable with the carriage so as to be yielded in an amount corresponding to the amount of movement of the carriage during approach of the carriage to the holder member, and releasing means for releasing the spring member from its yielded condition when the carriage is held by the holder member, the inverting mechanism being driven by a restoring force of the spring member.

DESCRIPTION OF THE PREFERRED EMBODIMENTS

A first embodiment of the invention will now be described with reference to FIGS. 3 to 6.

Figure 6:
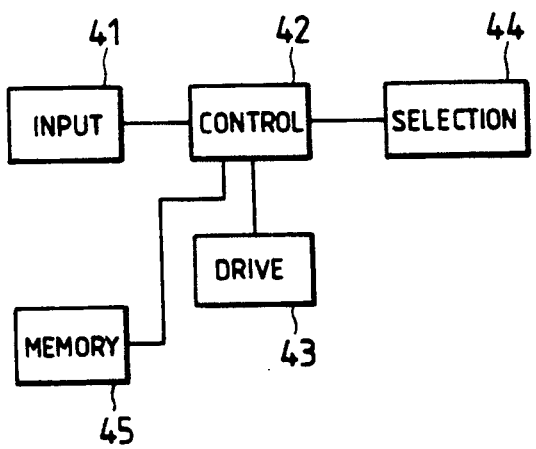
FIG. 6 is a block diagram of the disc player according to the present invention.

FIG. 6 is a block diagram of a disc player according to the present invention. When the selection of faces to be reproduced is instructed by operating an input means 41, a control circuit 42 comprising a microcomputer or the like controls a drive means 43 so as to be move a pickup 5 to the side of the selected face. For example, if the face A is selected, the pickup 5 is disposed on the side of the turntable 4 (on the lower side of a disc 1). If the face B is selected, the pickup 5 is disposed on the side opposite to the turntable 4 (on the upper side of the disc 1). In the case where two pickups 5 are disposed on the side of the turntable and on the side opposite to the turntable, respectively, that pickup corresponding to the selected face is used.

Figure 5:
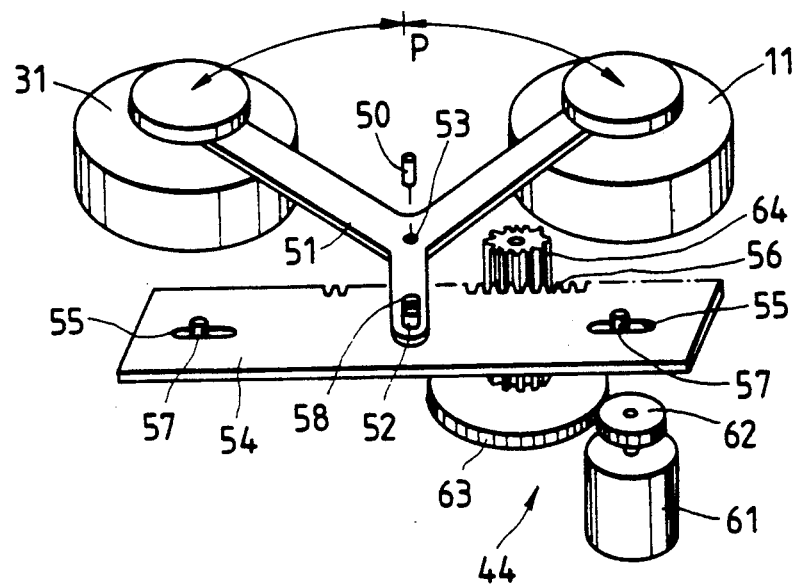
FIG. 5 is its perspective view.

When the face to be reproduced is selected, the control circuit 42 controls a selection means 44 so as to select and drive a clamper corresponding to the face to be reproduced. More specifically, according to the present invention, there are provided two clampers 11 and 31 as shown in FIG. 5, and one of the clampers can be moved to an operative position P (the position corresponding to the turntable 4) and positioned there by angularly moving an arm 51 with a pin 50, which extends through an aperture 53, serving as a pivot. More specifically, when a motor 61 is energized, a gear 62 is rotated, so that a gear 63 in mesh with the gear 62 as well as a gear 64 connected integrally to the gear 63 is rotated. A gear 56 of a rack 54 is in mesh with the gear 64, so that the rack 54 is moved in left- and right-hand directions in the FIG. 5. Slots 55 are formed through the rack 54, and pins 57 are passed through the slots 55, so that the movement of the rack 54 is guided by the pins 57. A pin 52 formed on the rack 54 is passed through a slot 58 of the arm 51, so that the arm 51 is angularly moved about the pin 50 in response to the movement of the rack 54. The pins 50 and 57, the motor 61 and the gears 62, 63 and 64 are fixedly mounted on a clamper holder which is not shown. When the face A is selected, the clamper 31 is selected, and when the face B is selected, the clamper 11 is selected.

Figure 4:
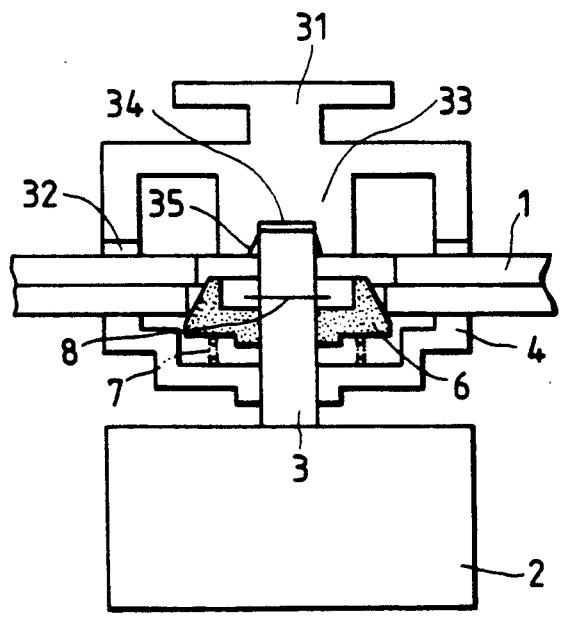

FIG. 4 shows a condition of clamping by the clamper 31. When the disc 1 is placed on the turntable 4, the centering hub 6 mounted at the inner periphery of the turntable 4 is inserted into the center hole of the disc 1. The centering hub 6 is pressed by the disc 1 and is moved downwardly against the bias of the spring 7, with the spindle 3 serving as a guide. At this time, the disc 1 is centered by the outer peripheral tapered surface of the centering hub 6. Since the centering hub 6 is disposed on the lower side (on the side of the turntable), the center of the center hole of the lower one of the two bonded discs is brought into alignment with the center of rotation of the spindle 3.

The clamper 31 is moved downwardly from an upper position, and the distal end of the spindle 3 is inserted into a hole 34 in a central projection 33 of the clamper, the distal end of the hole 34 is formed into a tapered surface 35 so as to facilitate the insertion of the spindle 3 into the hole 34. Magnets 32 for producing a clamping force are fixedly secured to the clamper 31, and the clamper 31 clamps the disc 1 on the turntable 4 through its attractive force applied to the turntable 4. The clamping force may of course be obtained by a spring or the like.

At this time, the pickup 5 is disposed on the turntable side (the lower side of the disc 1), and reproduces the lower face (face A).

Figure 1:
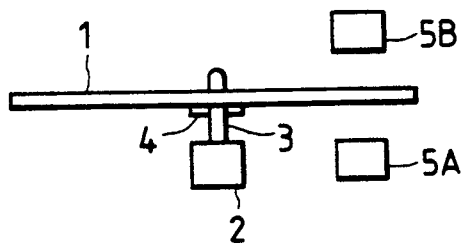
FIG. 1 is a structural view of a conventional disc player.
Figure 2:
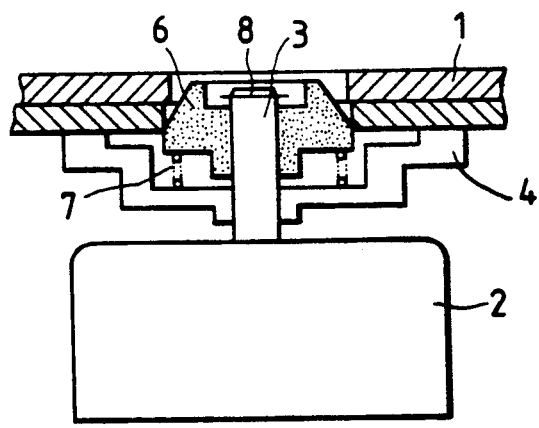
FIG. 2 is a cross-sectional view of its clamper.
Figure 3:
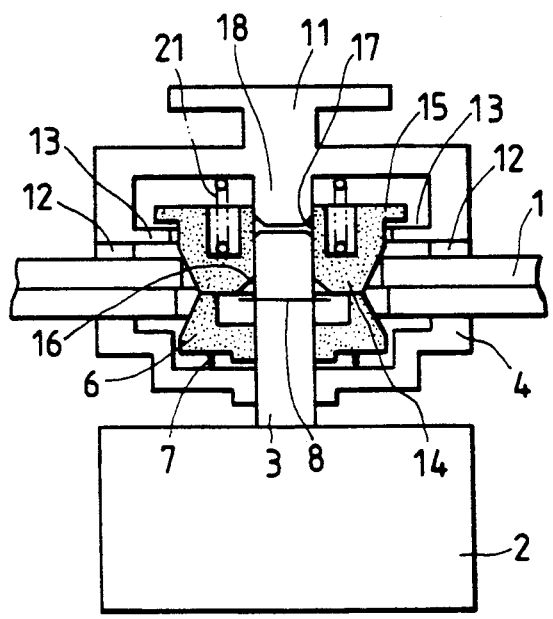
FIGS. 3 and 4 are cross-sectional view of clampers used in a disc player according to the present invention.

FIG. 3 shows a condition of clamping by the clamper 11. The disc 1, when placed on the turntable 4, is once centered by the centering hub 6 in the manner described above. However, when the clamper 11 is moved downwardly, the distal end of the spindle 3 is inserted into a central hole 17 of a centering hub 14 mounted on the clamper 11. To facilitate this insertion, the distal end of the hole 17 is formed into a tapered surface 16. A spring 21 is set so as to produce a urging force greater than that of the spring 7. Therefore, the centering hub 6 urged by the spring 7 is pressed by the centering hub 14 urged by the spring 21 and is moved downwardly. When the centering bub 14 moves downwardly with the spindie 3 serving as a guide, a tapered surface at its outer periphery presses the upper edge of the center hole of the disc 1 to center it.

Since the centering hub 14 is disposed on the upper side of the disc 1, the center of the center hole of the upper disc is brought into alignment with the center of rotation of the spindle 3. In a manner as described above, the clamper 11 clamps the disc 1 on the turntable 4 through an urging force of a magnet 12.

At this time, the pickup 5 is disposed on the upper side of the disc 1 (the side opposite to the turntable 4), and reproduces the upper face (face B).

In a non-clamping condition, the centering hub 14 urged by the spring 21 is held in such a position that its flange 15 is engaged with a flange 13 of the clamper 11. A central projection 18 of the clamper 11 is received in the hole 17 of the centering hub 14 to position the centering hub 14 at the central portion of the clamper 11. Therefore, the centering on the basis of the spindle 3 is positively carried out.

When the control circuit 42 controls the selection means 44 to select and drive the clamper, it causes a memory means 45 to memorize the selected clamper. When the surface to be reproduced is inputted from the input means 41, the control circuit compares the memory of the memory means 45 with the reproduction face inputted as command, and controls the selection means 44 to switch the clampers when the clamper which is effecting its clamping operation does not correspond to the reproduction face.

As described, according to the present invention, since the separate centering hubs are mounted on the turntable and the clamper, respectively, the reproduction can be effected with little eccentricity when either face of one disc composed of the two bonded discs is reproduced.

A second embodiment of the invention will now be described with reference to FIGS. 7 to 14.

Figure 8:
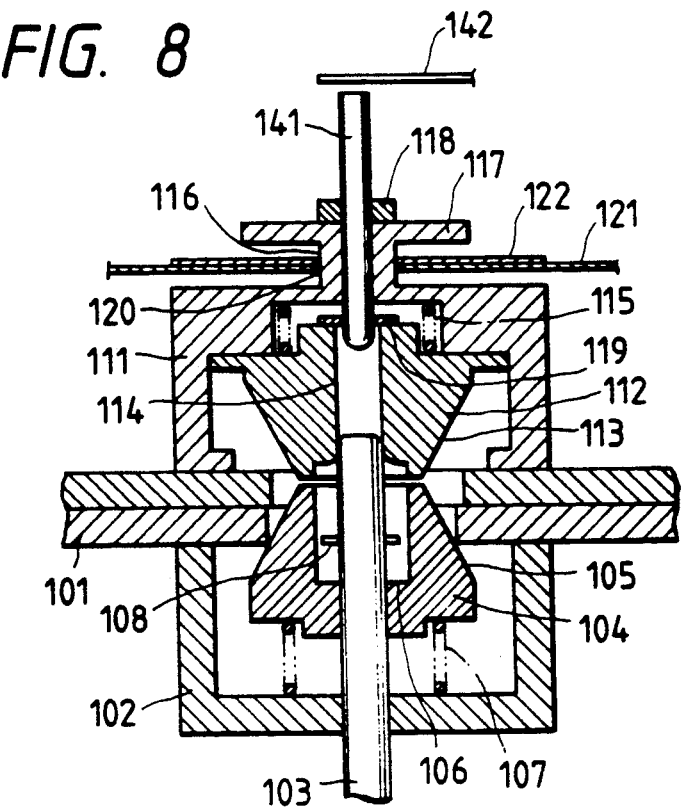

FIG. 8 shows a clamping condition in the case of reproducing a face A (lower face) of a disc. A centering hub 104 serving as a centering means and disposed inside a turntable 102 has a tapered surface 105 at its outer periphery. The centering hub 104 is urged upwardly in the drawings by a spring 107, and is normally moved upwardly to a position where its bottom surface 106 is engaged with a stopper 108 of a spindle 103. When a video disc 101 is placed on the turntable 102 fixedly secured to the spindle 103, the centering hub 104 is inserted into its center hole. The tapered surface 105 is engaged with an edge of the center hole of the lower one of the two bonded discs of the disc 101, and the centering hub 104 is moved downwardly, with the spindle 103 serving as a guide. At this time, the disc 101 is centered in such a manner that the center of the center hole of its lower disc is brought into alignment with the center of the spindle 103.

Next, a clamper holder 121 is moved downwardly. A constricted portion 116 of a clamper 111 is extended through a hole 120 of the holder 121. Since a flange 117 is formed at a distal end of the constricted portion 116, the clamper 111 is rotatably supported by the holder 121 in a manner not to become disengaged therefrom. A centering hub 112 serving as a centering means is mounted within the clamper 111. The centering hub 112 is urged upwardly in the drawings by a spring 115, and is stopped at a position where an upper surface of its outer peripheral portion is engaged with an inner upper surface of the outer peripheral portion of the clamper 111. When the centering hub 112 is moved downwardly together with the clamper 111 in accordance with the downward movement of the holder 121, a front end of the spindle 103 is inserted into a central hole 114 of the centering hub 112. As a result, the center of the clamper 111 is aligned with the spindle 103. When the clamper 111 further moves downwardly, a bottom surface of its outer peripheral portion is brought into abutment with the disc 101. The clamper 111 is urged toward the turntable 102 by a magnet, a spring or the like which is not shown in the drawings. In this manner, the disc 101 is clamped on the turntable 102.

In this condition, the spindle 103 is rotated in a counterclockwise direction as viewed from the direction of the turntable 102, and the reproduction of the face A is effected by a pickup (not shown) disposed on the turntable side (on the lower side of the disc 101 in the drawings).

Figure 7:
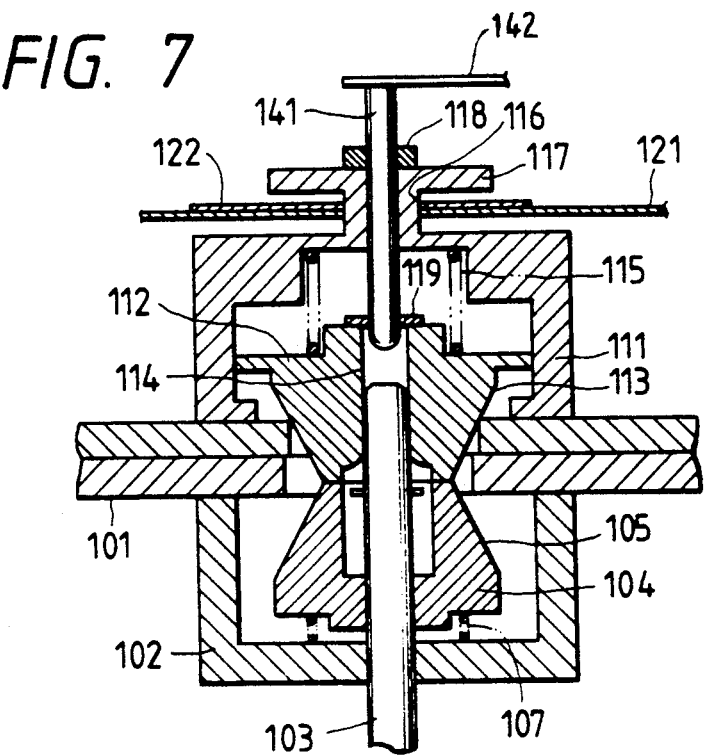
FIGS. 7 and 8 are cross-sectional views explanatory of clamping conditions in accordance with another embodiment of the inventions.

On the other hand, when the condition of reproducing the face A is shifted to the reproduction of the face B, first, the spindle 103 is rotated in a direction reverse to the above-mentioned direction. At this time, a shaft 141 is urged by an arm 142 to move downwardly as later described. The centering hub 112 is fixedly secured to a front end of the shaft 141 through its flange 19. As a result, the centering hub 112 is moved downwardly, so that its front end is brought into engagement with the front end of the centering hub 104. At this time, the centering hub 104 is urged downwardly against the bias of the spring 107. The shaft 141 (the centering hub 112) is urged under such a force that the centering force (force in a horizontal direction) exerted by a tapered surface 113 is greater than a horizontal frictional force of the disc 101 resulting from a clamping force produced by a magnet or the like. As a result, the tapered surface 113 of the centering hub 112 is brought into engagement with an edge of the center hole of the upper disc of the disc 101, so that the disc 101 is centered while being maintained in the clamped condition in such a manner that the center of the center hole of the upper disc is brought into alignment with the center of the spindle 103. As a result, the disc 101 is clamped as shown in FIG. 7.

In this condition, the reproduction of the face B is effected by the pickup disposed on the upper side of the disc 101. The disc 101 is rotated in a counterclockwise direction as viewed from that pickup.

In contrast, when the condition of reproducing the face B is shifted to the condition for reproducing the face A, the holder 121 is moved upwardly after the rotation of the spindle 103 is stopped, and the clamping is once released, and the clamping operation as shown in FIG. 7 is again carried out in the manner described above.

Next, a mechanism for moving the shaft 141 upwardly and downwardly will be described.

Figure 9:
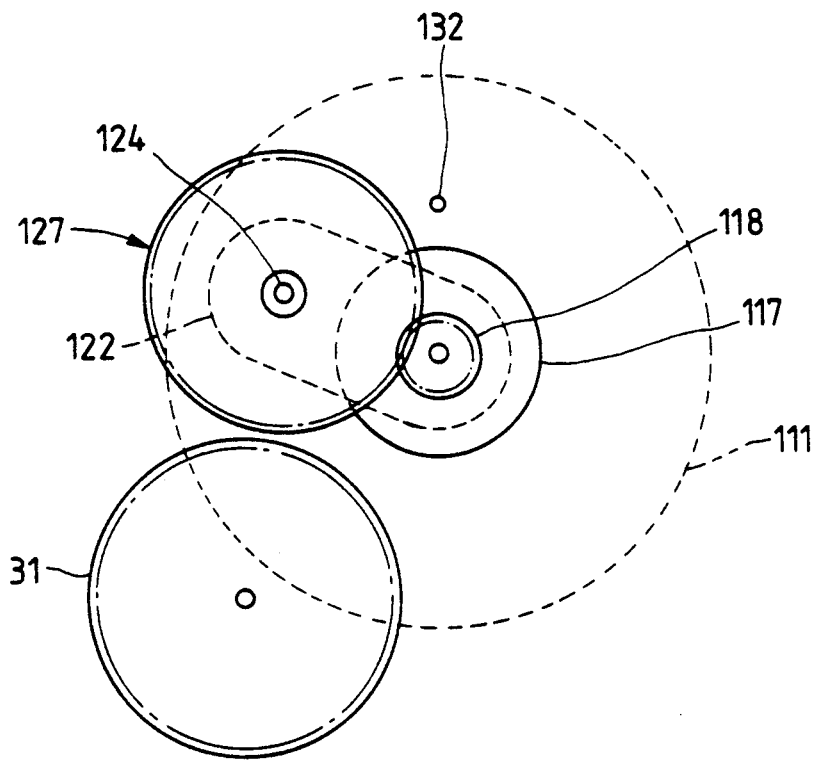
FIGS. 9 and 10 are plan and front-elevational views of its drive means, respectively.
Figure 10:
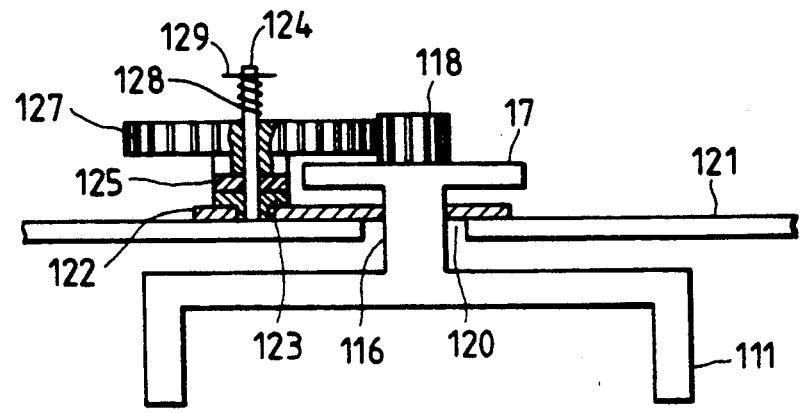
Figure 11:
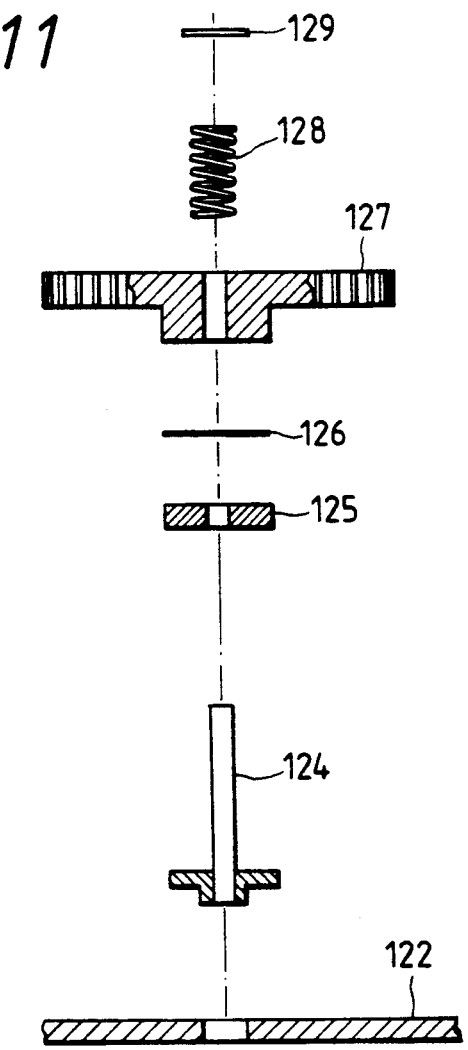
FIG. 11 is an exploded view of the drive means.

As shown in FIGS. 9 to 11, a plate 122 is rotatably mounted on the constricted portion 116 of the clamper 111. A pin 124 is fixedly secured to the plate 122 by pressing or the like. The pin 124 extends through a gear 127 having a felt 125 affixed to a lower surface thereof by a double-coated tape 126. An E-ring 129 is fixedly secured to the other end of the pin 124, and a spring 128 is interposed between the E-ring 129 and the gear 127, so that the felt 125 is urged against the plate 122. The gear 127 is in mesh with a gear 118 fixedly secured to the flange 17 of the clamper 11.

In the condition as shown in FIG. 8 (the condition of centering by the centering hub 104), when the turntable 102 (and hence the clamper 111) is rotated in a counterclockwise direction as viewed from the clamper (in a clockwise direction as viewed from the turntable 102), the gear 118 is rotated in a counterclockwise direction in FIG. 9. As a result, the gear 127 in mesh with the gear 118 is rotated in a clockwise direction. Upon clockwise rotation of the gear 127, the plate 122 is angularly moved about the constricted portion 116 of the clamper 111 in a counterclockwise direction due to a frictional force produced by the felt 125. Therefore, the gear 127 is moved to a position where it is brought into meshing engagement with a gear 131 rotatably supported on the holder 121. The gear 131 is driven by the gear 127 for rotation in a counterclockwise direction.

Figure 12:
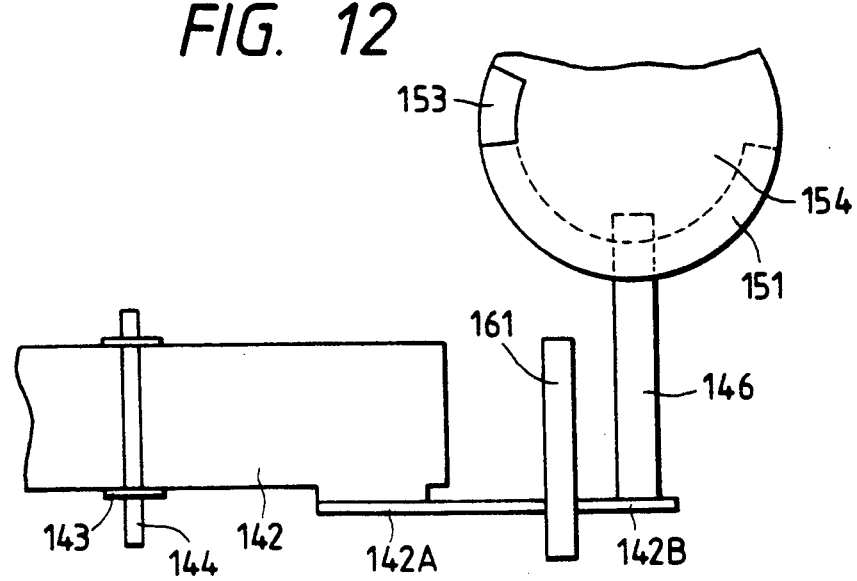
FIGS. 12, 13, and 14 are plan, front-elevational and side-elevational views of the drive means, respectively.
Figure 13:
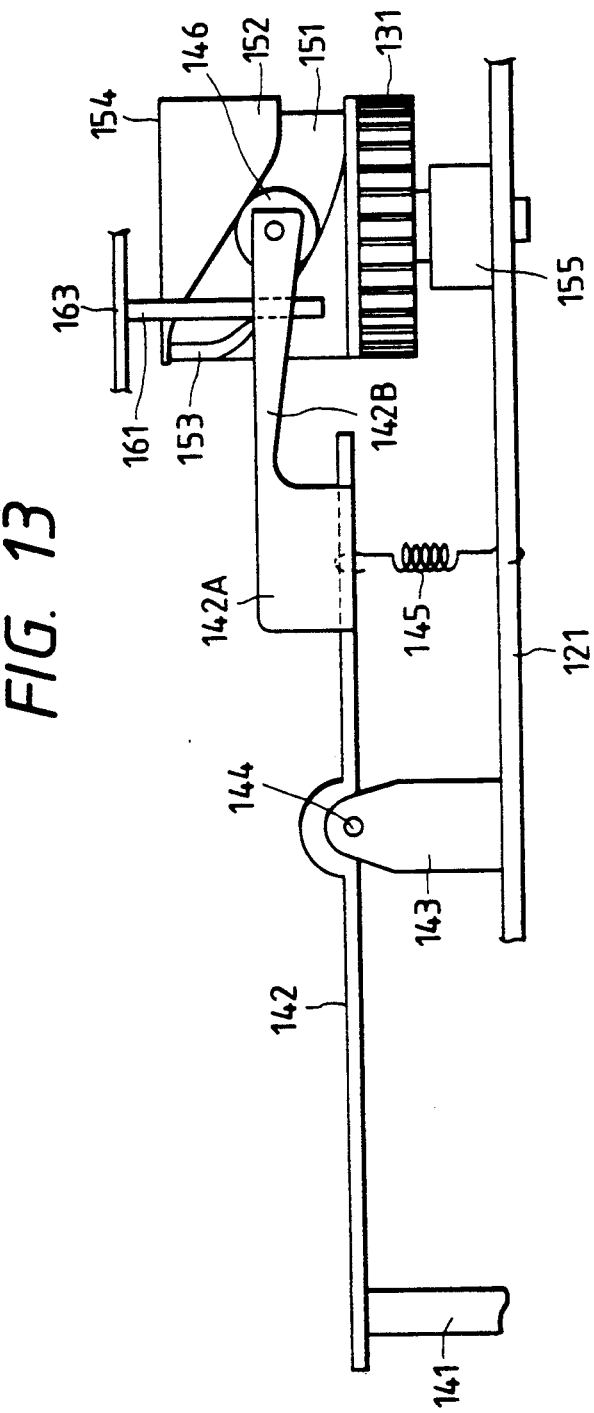
Figure 14:
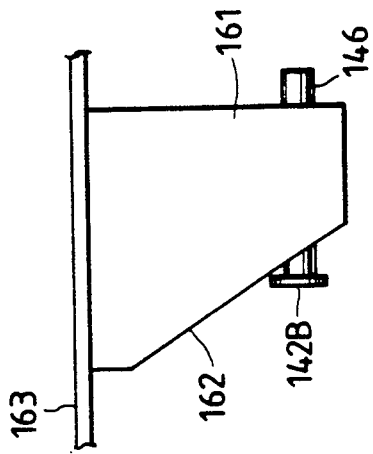

As shown in FIGS. 12 and 13, the gear 131 is mounted on the holder 121 through a pin 155. Also, a cam cylinder 152 having a cam 151 is integrally secured to the gear 131.

When the gear 131 is rotated in a counterclockwise direction, the cam cylinder 152 is rotated together with the gear 131. At this time, a pin 146 fixedly secured to the arm 142 is urged by the cam 151 to be moved upwardly. As a result, the arm 142, which is angularly movably mounted on a stamped, raised portion 143 of the holder 121 through a shaft 144, is rotated about the shaft 144 in a counterclockwise direction in FIG. 13 against the bias of a spring 145. Therefore, the other end of the arm 142 urges the shaft 141 downwardly, so that the centering hub 112 is driven in the manner described above.

In accordance with the rotation of the cam cylinder 152, the pin 146 rises from an end 153 of the cam 151 onto an upper surface 154 of the cam cylinder 152. Since the distal end of the pin 146 is urged against a vertical wall of the cam cylinder 152, a mounting portion 142B of the arm 142 on which the pin 146 is mounted is slightly angularly moved about a connecting portion 142A in a clockwise direction in FIG. 12. Therefore, when the pin 146 moves from the cam 151 to the upper surface 154, the mounting portion 142B is angularly moved about the connecting portion 142A in a counterclockwise direction in FIG. 13 due to its resilient force so as to be returned. As a result, the pin 146 is slightly moved angularly toward the center of rotation of the cam cylinder 152 as indicated in a dot-and-dash line in FIG. 12. As a result, when the cam cylinder 152 continues to rotate during the reproduction of the disc, the pin 146 is disposed on the upper surface 154 of the cam cylinder 152 to allow the rotation of the cam cylinder 152.

Thus, the drive means for driving the centering hub 112 is constituted by the mechanism for transmitting the rotation of the spindle 103 (the turntable 102) from the clamper 111 to the shaft 141.

When the reproduction of the face B is to be stopped (or the reproduction of the face B is to be switched to the reproduction of the face A), the holder 121 is once moved upwardly as described above. At this time, the mounting portion 142B of the arm 142 is brought into abutment with a tapered surface 162 of a reset plate 161 fixedly secured to a chassis 163, so that the mounting portion 142B is angularly moved about the connecting portion 142A in a clockwise direction in FIG. 13. Therefore, the pin 146 becomes disengaged from the upper surface 154 of the cam cylinder 152, and the arm 142 is returned to its initial position under the bias of the spring 145.

At the time of reproduction of the face A, the gear 118 is rotated in a clockwise direction in FIG. 9. Therefore, the plate 22 is angularly moved in a clockwise direction and is caused to stop at a position where it engages with a pin 132 formed on the holder 121. At this time, the gear 131 does not rotate because its meshing engagement with the gear 127 is released, so that the centering hub 112 is not driven.

As described above, according to the present invention, since the centering means disposed on the side opposite to the turntable is driven, making use of the rotation of the turntable, there is no need for any special drive source, and the compactness and low cost can be achieved.

A pickup reversing mechanism of the invention will now be described with reference to FIGS. 15 to 17.

Figure 15:
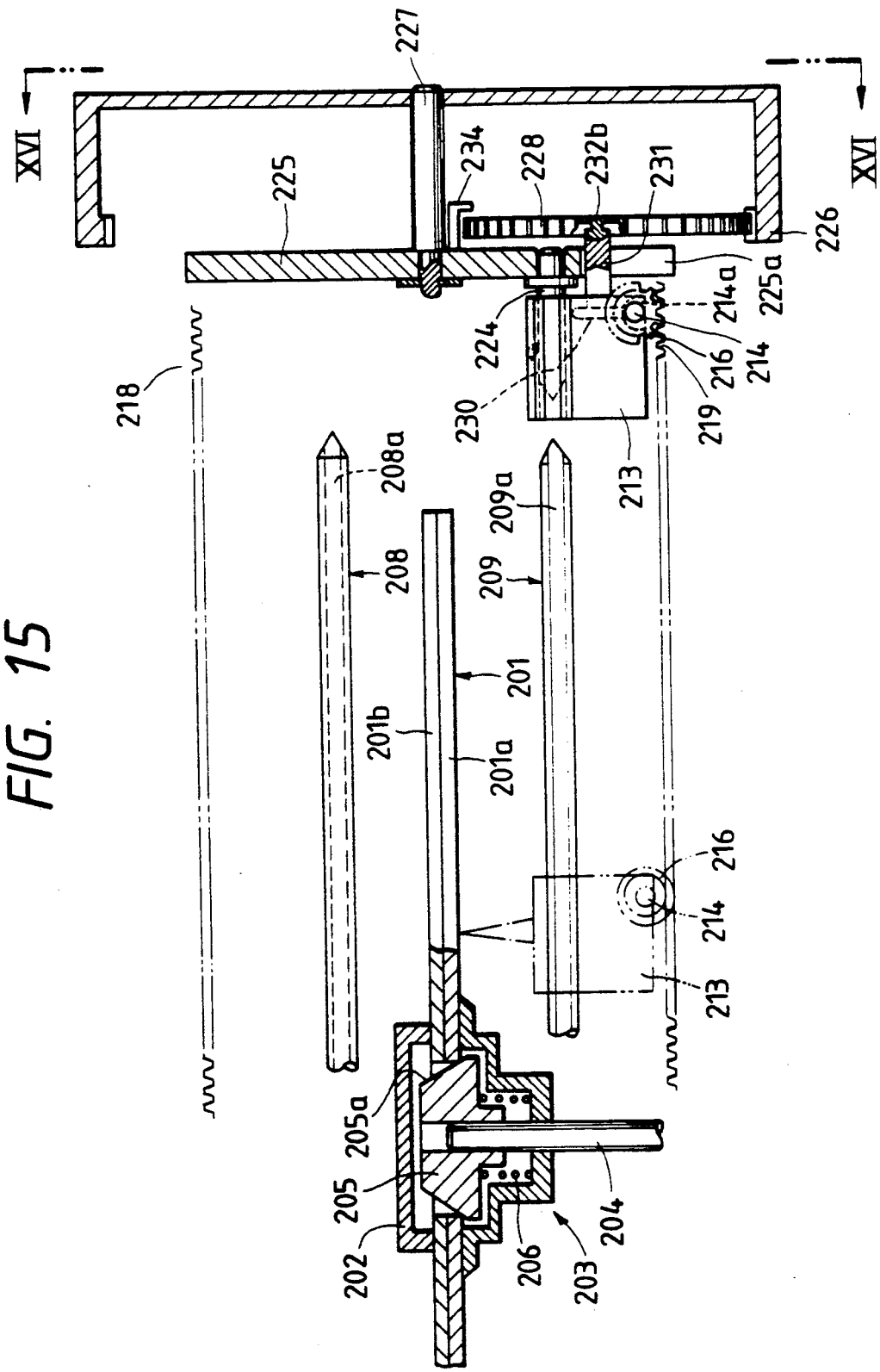
FIG. 15 is a partly cross-sectional, side-elevational view of an important portion of a double-sided playing disc player according to the present invention.
Figure 16:
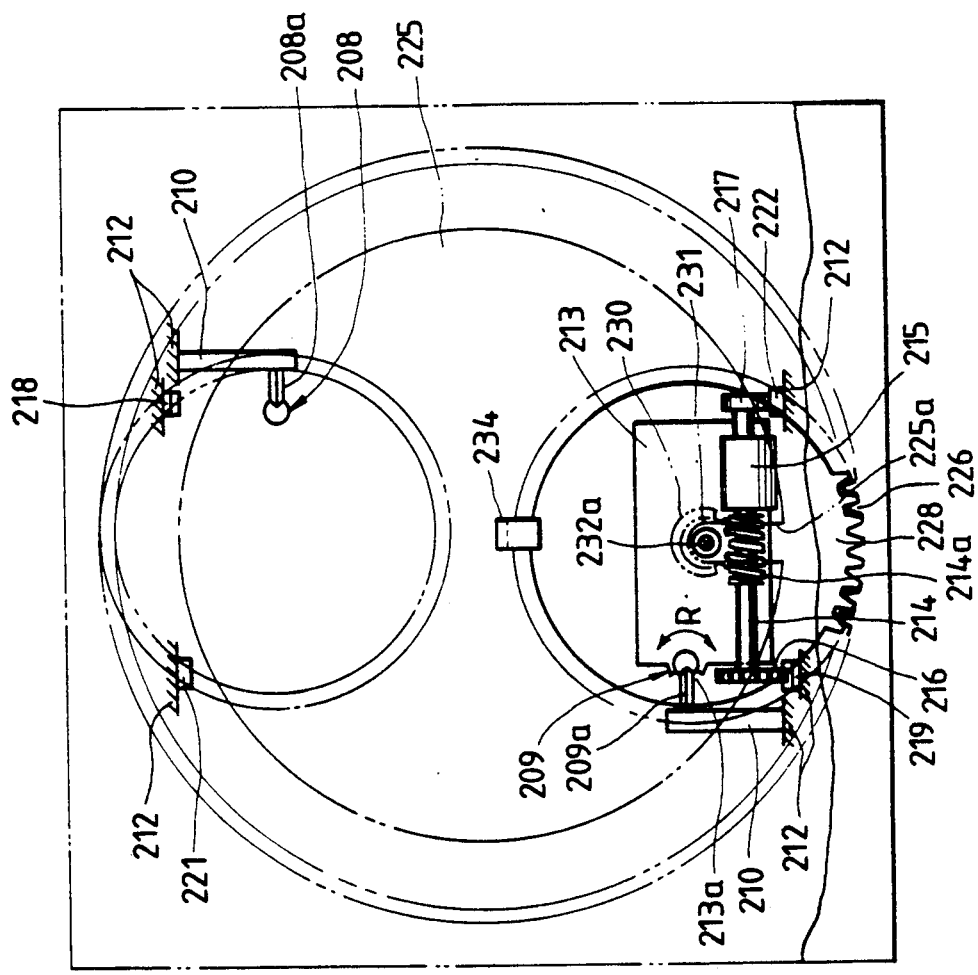
FIG. 16 is a view as seen along the line XVI—XVI of FIG. 15.

As shown in FIGS. 15 and 16, a disc 201 is clamped on a turntable 203 by a clamper 202. A centering member 205 is slidably mounted on a spindle 204 which drives the turntable 203 for rotation, and a coil spring 206 for biasing the centering member upwardly is interposed between the centering member and the turntable 203. The centering member 205 has a tapered surface 205a at its outer periphery, and this tapered surface is received in a center hole of the disc 201 so as to center the disc 201 with respect to the turntable 203. Incidentally, the disc 201 is made of two disc-shaped substrates 201a and 201b having respective recording layers and bonded together with their recording layers disposed inwardly.

First and second guide members 208 and 209 of a cylindrical shape are disposed radially of the disc 201 and parallel to the recording surfaces of the disc in such a manner that the disc is interposed therebetween in upward and downward directions, and these members are mounted on a chassis 212 through projecting portions 208a and 209a formed at their respective sides and brackets 210. A carriages 213 can be detachably mounted on the first and second guide members 208 and 209. An single optical pickup means is contained in the carriage 213.

A shaft 241 is rotatably mounted at a front end portion of the carriage 213, and is driven for rotation by a motor 215. A gear 216 and a roller 217 are mounted on opposite ends of the shaft 214, respectively. A pair of rack members 218 and 219 are disposed parallel to the first and second guide members 208 and 209 in such a manner that the disc 201 is interposed between the racks members, these rack members being fixedly secured to the chassis 212. The gear 216 mounted on one end of the shaft 214 is meshingly engageable with each of the rack members 218 and 219. Rails 221 and 222 are arranged parallel to the respective rack members 218 and 219 and are disposed, like the rack members 218 and 219, in such a manner that the carriage 213 is interposed therebetween, these rails being fixedly secured to the chassis 212. The roller 217 mounted on the other end of the shaft 214 rollingly movable on each of the rails 221 and 222. As shown in FIG. 16, the carriage 213 is rotatable about the first guide member 208 or the second guide member 209 in directions indicated by an arrow R, and the carriage 213 has a notch 213a so that the carriage 213 will not interfere with the projecting portion 208a, 209a of each of the guide members 208 and 209 when it is rotated.

The outer end of each of the first and second guide members 208 and 209 is pointed, and the carriage 213 can be attached to and detached from each of the guide members 208 and 209 through this pointed end. A support pin 224 is provided for engagement with the carriage 213, detached from each of the guide members 208 and 209, instead of the guide members so as to support it. The support pin 224 is secured to a disc-shaped rotary member 225. The rotary member 225 is rotatably supported by a support shaft 227 secured to an internal sun gear 226 disposed in concentric relation to the rotary member. The rotary member 225 is so arranged as to rotate along a plane intersecting the direction of guiding of the carriage 213 by the first and second guide members 208 and 209, and in this case, along a plane perpendicular thereto. A planetary gear 228 is in mesh with the sun gear 226.

A worm gear 214a is formed on the shaft 214 rotatably mounted on the carriage 213, and a worm wheel 230 mounted on the carriage 213 is in mesh with the worm gear 214a. A shaft 231 is formed integrally with the worm wheel 230 in concentric relation thereto. Formed at a front end of the shaft 231 is a claw 232a (FIG. 16) which is one of two engageable claws of a clutch and is engageable with the other claw 232b (FIG. 15) formed at the center of rotation of the planetary gear 228. The rotary member 225 has a U-shaped notch 225a in which the shaft 231 can be received. The rotary member 225 has a retainer member 234 projecting therefrom and disposed in sliding contact with the planetary gear 228 for preventing it from being displaced in its axial direction.

Figure 17:
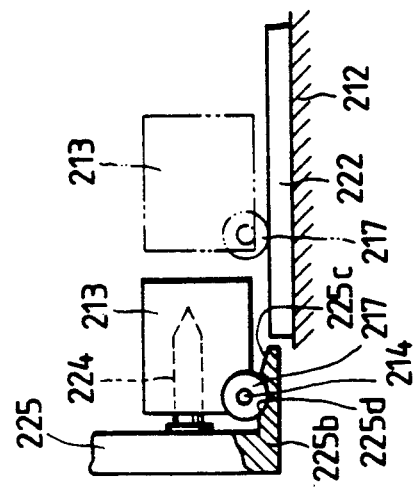
FIG. 17 is a fragmentary, detailed view of the important portion of the double-sided playing disc player of FIG. 15.

As shown in FIG. 17, a projecting portion 225b is formed on the rotary member 225 and extends toward the rail 222 (or 221), and the roller 217 disengaged from the rail 222 rides on a tapered surface 225c of the projecting portion 225b and then is received in an arcuate recess 225c formed rearwardly of this tapered surface. With this arrangement, the carriage 213 is positioned with respect to the support pin 224 and the rotary member 225, and it will not be disengaged from the support pin 224 unless a force of more than a predetermined value is ;applied. In order that the roller 217 can move from the rail 222 (or 221) onto the tapered surface 225c of the projecting portion 225b, the carriage 213 need be rotated about the first guide member 208 or the second guide member 209, and this rotation (in the directions of the arrow R) can be achieved because, as described above, the notch 213a is formed in the carriage 213 at the portion thereof where the carriage engages with end of the two guide members. A holder member for holding the carriage 213 is constituted by the projecting portion 225b, including the tapered surface 225c and the arcuate recess 225d, and the support pin 224.

A torque transmitting mechanism for transmitting a torque to the rotary member 225 is constituted by the sun gear 226 and the planetary gear 228. The torque transmitting mechanism, the above-mentioned clutch and the rotary member 225 constitute an inverting mechanism for moving the holder member, which includes the support pin 224, from one of the attachment-/detachment positions of the first and second guide members 208 and 209 to the other along a plane intersecting the direction of guiding by each of the two guide members.

Next, the operation of the double-sided playing disc player will be described briefly.

As shown in FIG. 15, when the playing of the lower recording surface of the disc 201 is finished, the carriage 213 is further moved outwardly, so that it is disengaged from the second guide member 209 and is fitted on the support pin 224. At the same time, the clutch comprising the claws 232a and 232b is brought into its engaged condition. Then, the motor 215 further rotates, and the planetary gear 228 begins to revolve within the internal sun gear 226. As a result, since the shaft 231 integral with the worm wheel 230 is received in the U-shaped notch 225a, the rotary member 225 is rotated in accordance with the revolution of the planetary gear 228. Therefore, the carriage 213 begins to be inverted. When the inversion of the carriage 213 is completed in such a manner that it corresponds to the upper recording surface of the disc 201, this is detected by a detector means which is not shown. As a result, the motor 215 is rotated in its reverse direction, and the carriage 213 is disengaged from the support pin 224 and is moved onto the first guide member 208. Then, the disc 201 is driven for rotation in a direction opposite to the direction at the time of playing of the lower recording surface of the disc 201, so that the playing of the upper recording surface of the disc 201 is started.

The inverting movement of the carriage 213 to the position corresponding to the lower recording surface of the disc 201 is carried out in a manner reverse to the above procedure.

As described above in detail, in the double-sided playing disc player according to the present invention, the guide and drive means for guiding and driving the carriage, which carries the pickup means, to move it along both recording surfaces of the disc comprises the first and second guide members disposed in such a manner that the disc is interposed therebetween, and disposed to detachably support the carriage at the predetermined attachment/detachment positions; a holder member for holding the carriage at the predetermined attachment/detachment positions; an inverting mechanism for moving the holder member from one of the attachment/detachment positions of the first and second guide members to the other; and the drive means for moving the carriage on the first and second guide members and for driving the inverting mechanism so as to move the holder member.

More specifically, by driving the inverting mechanism, the carriage carrying the pickup means is suitably moved together with the holder member holding the carriage so as to correspond to both recording surfaces of the disc on the turntable whereby both sides of the disc can be played without ejecting the disc.

With this construction, only one pickup means which is expensive is needed, and the low cost is achieved.

Also, in the double-sided playing disc player according to the present invention, the holder member is moved along a plane intersecting the directions of guiding by the guide members. If the direction of movement of the holder member for holding the carriage, which carries the pickup means, and moving it in an inverting manner so as to bring it into correspondence with either recording surface of the disc coincides with the direction of guided movement of the carriage by the guide members at the time of the disc playing, the stroke of movement of the carriage required for this inverting movement will be added to the stroke of movement of the carriage at the time of the disc playing, which will make the overall construction of the disc player large. As described above, in the double-sided playing disc player, the direction of inverting movement of the carriage intersects the direction of movement of the carriage at the time of the disc playing, and therefore a compact overall construction of the disc player can be achieved.

Further, as is clear from the foregoing, in the double-sided playing disc player according to the present invention, it is only the relatively small carriage carrying the pickup means that is moved in an inverting manner to correspond to either recording surface of the disc, and therefore a space required for the inverting movement of the pickup means can be small, and also the drive means for driving the lightweight carriage can be of the small type. In these respects, also, the overall construction of the disc player can easily be made compact.

Another example of a pickup reversing mechanism for double-sided playing disc player according to the present invention will now be described with reference to FIGS. 18 to 21, in which the same reference numeral as the mechanism shown in FIGS. 15 to 17 are used to indicate the like components or members.

The outer end of each of the first and second guide members 208 and 209 is pointed, and the carriage 213 can be attached to and detached from each of the guide members 208 and 209 through this pointed end. A support pin 324 is provided for engagement with the carriage 213, detached from each of the guide members 208 and 209, instead of the guide members so as to support it. The support pin 324 is secured to a disc-shaped rotary member 325 through a boss 326, and is rotatable and axially slidable with respect to the rotary member 325. The rotary member 325 is rotatably supported by a support shaft 328 secured to an internal sun gear 327 disposed in concentric relation to the rotary member. The rotary members 325 is so arranged as to rotate along a plane intersecting the direction of guiding of the carriage 213 by the first and second guide members 208 and 209, and in this case, along a plane perpendicular thereto. A planetary gear 329 is in mesh with the sun gear 326. The rotary member 325 has a retainer member 330 projecting therefrom and disposed in sliding contact with the planetary gear 329 for preventing it from being displaced in its axial direction.

A coil spring 332 is fitted on a rear portion of the support pin 324 which serves to support the carriage 213 disengaged from the first and second guide members. One end of the coil spring 332 is fixedly secured to the support pin 324 while the other end is engaged with a pin 329a projecting from the planetary gear 329 adjacent to an outer periphery thereof. A flange 324a for engagement with the carriage 213 to position the carriage is formed on the support pin 324.

Figure 20:
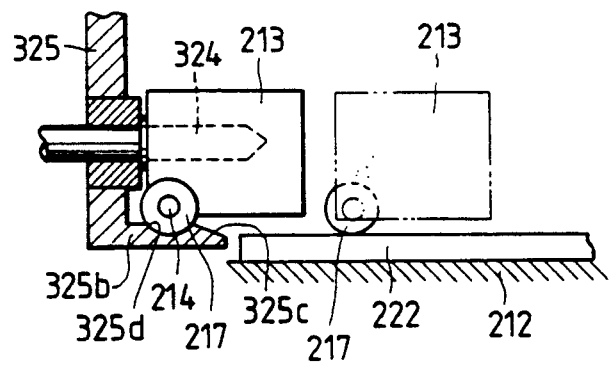
FIGS. 20 and 21 are fragmentary, detailed views of the important portion of the double-sided playing disc player of FIG. 18.

As shown in FIG. 20, a projecting portion 325b is formed on the rotary member 325 and extends toward the rail 222 (or 221), and the roller 217 disengaged from the rail 222 rides on a tapered surface 325c of the projecting portion 325b and then is received in an arcuate recess 325c formed rearwardly of this tapered surface. With this arrangement, the carriage 213 is positioned with respect to the support pin 324 and the rotary member 325, and it will not be disengaged from the support pin 324 unless a force of more than a predetermined value is applied. In order that the roller 217 can move from the rail 222 (or 221) onto the tapered surface 325c of the projecting portion 325b, the carriage 213 need be rotated about the first guide member 208 or the second guide member 209, and this rotation (in the directions of the arrow R) can be achieved because, as described above, the notch 213a is formed in the carriage 213 at the portion thereof where the carriage engages with each of the two guide members. A holder member for holding the carriage 213 is constituted by the projecting portion 325b, including the tapered surface 325c and the arcuate recess 325d, and the support pin 324.

Figure 21:
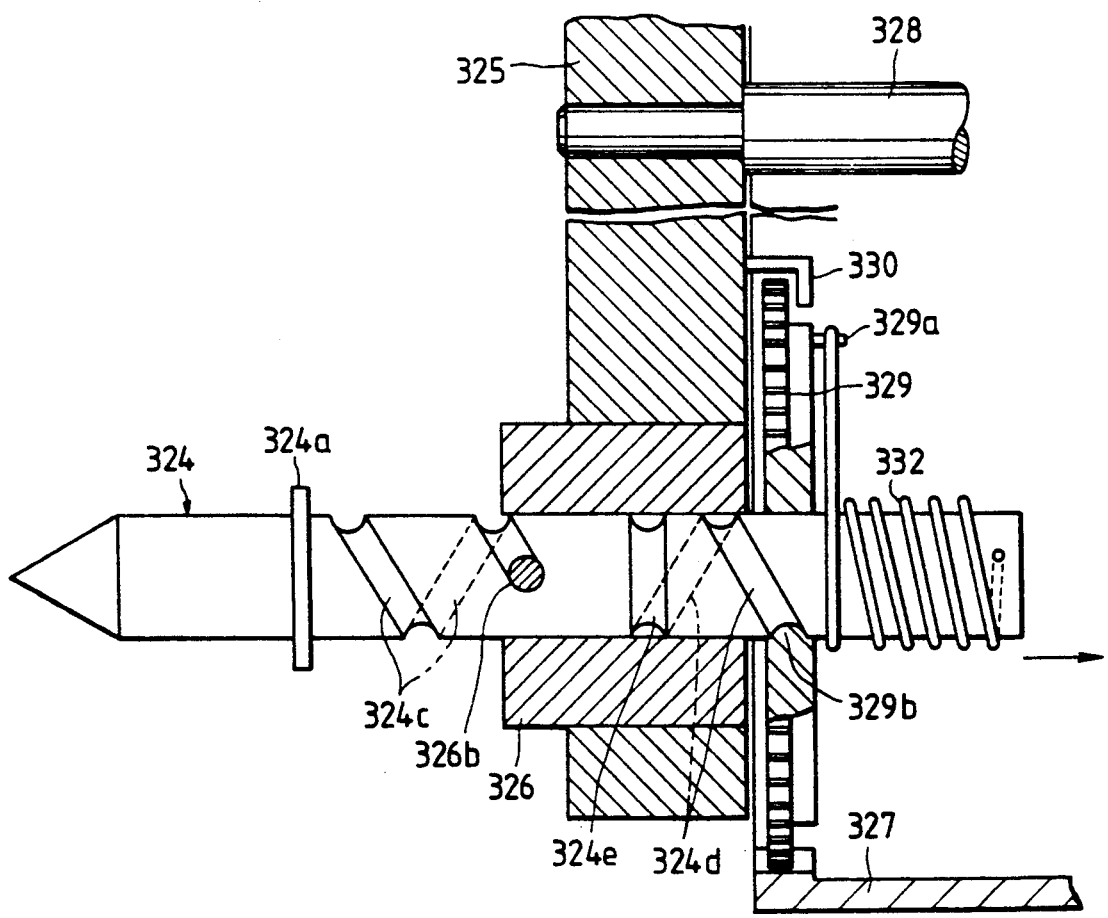

As shown in FIG. 21, the support pin 324 for supporting the carriage 213 has two spiral grooves 324c and 324d of the same pitch formed in its outer peripheral surface and spaced axially from each other. An annular groove 324e is also formed in continuous relation to the rear spiral groove 324d. Semi-spherical projections 326b and 329b are formed respectively on the boss 326 and at the center hole of the planetary gear 329, the support pin 324 being slidably engaged with this boss and this central hole. One projection 326b is disposed in sliding contact with the spiral groove 324c while the other projection 329b is disposed in sliding contact with the spiral groove 324d and the annular groove 324e.

A torque transmitting mechanism for transmitting a torque to the rotary member 325 is constituted by the sun gear 327 and the planetary gear 329. The torque transmitting mechanism, the rotary member 325 and the support shaft 328 constitute an inverting mechanism for moving the holder member (mentioned above), which includes the support pin 324, in a inverted manner from one of the attachment/detachment positions of the first and second guide members to the other along a plane intersecting the direction of guiding by each of the two guide members. And, a drive means for driving the inverting mechanism to move the holder member, which includes the support pin 324, in an inverted manner is constituted by the shaft 214, the motor 215, the gear 216 and the roller 217 which are mounted on the carriage 213, the rack members 218, 219, the rails 221, 222, the coil spring 332, and the spiral grooves 324c, 324d and the annular groove 324e which are formed in the support pin 324.

Next, the operation of the double-sided playing disc player will be described briefly.

Figure 18:
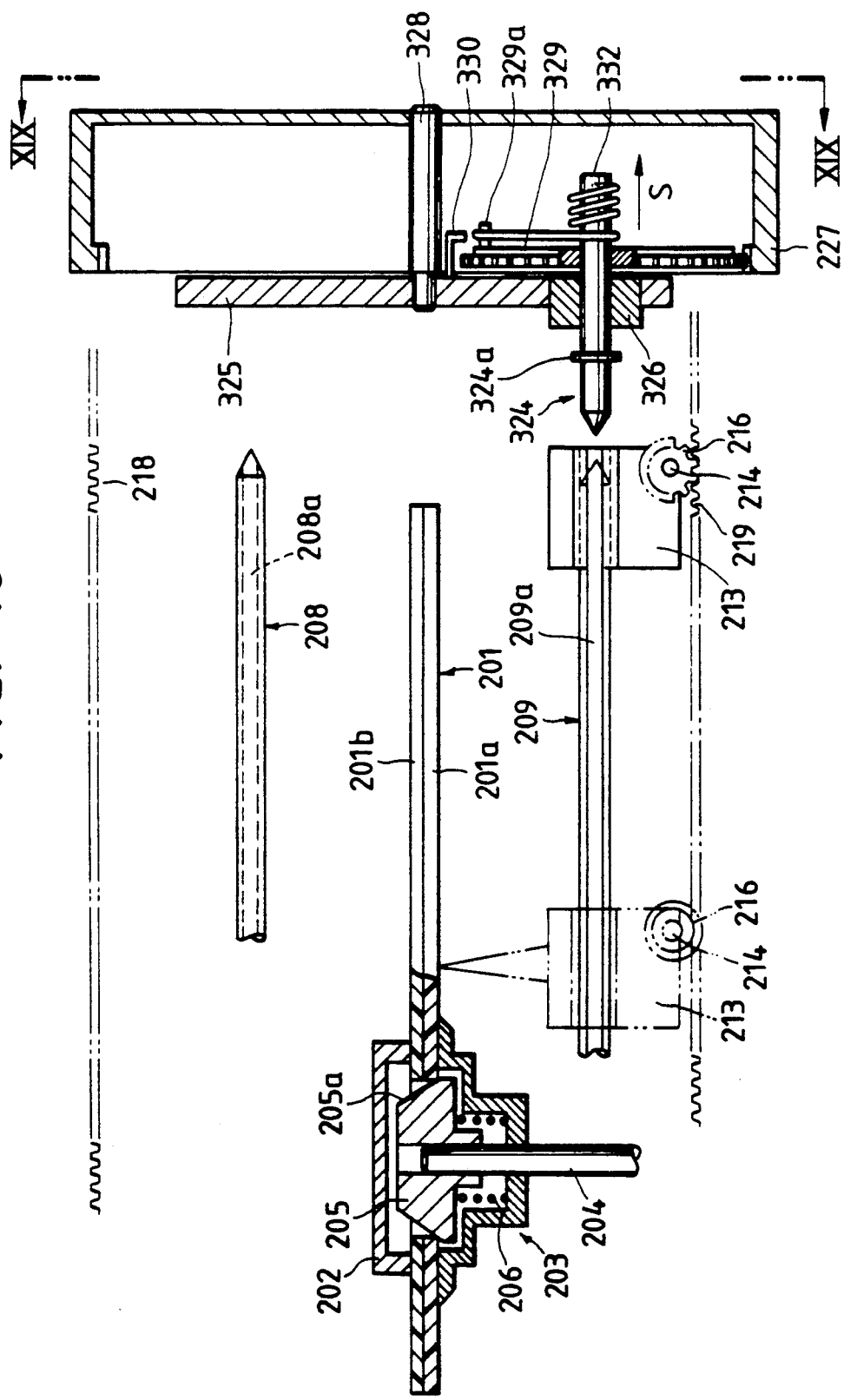
FIG. 18 is a partly cross-sectional, side-elevational view of an important portion of another double-sided playing disc player according to the present invention.
Figure 19:
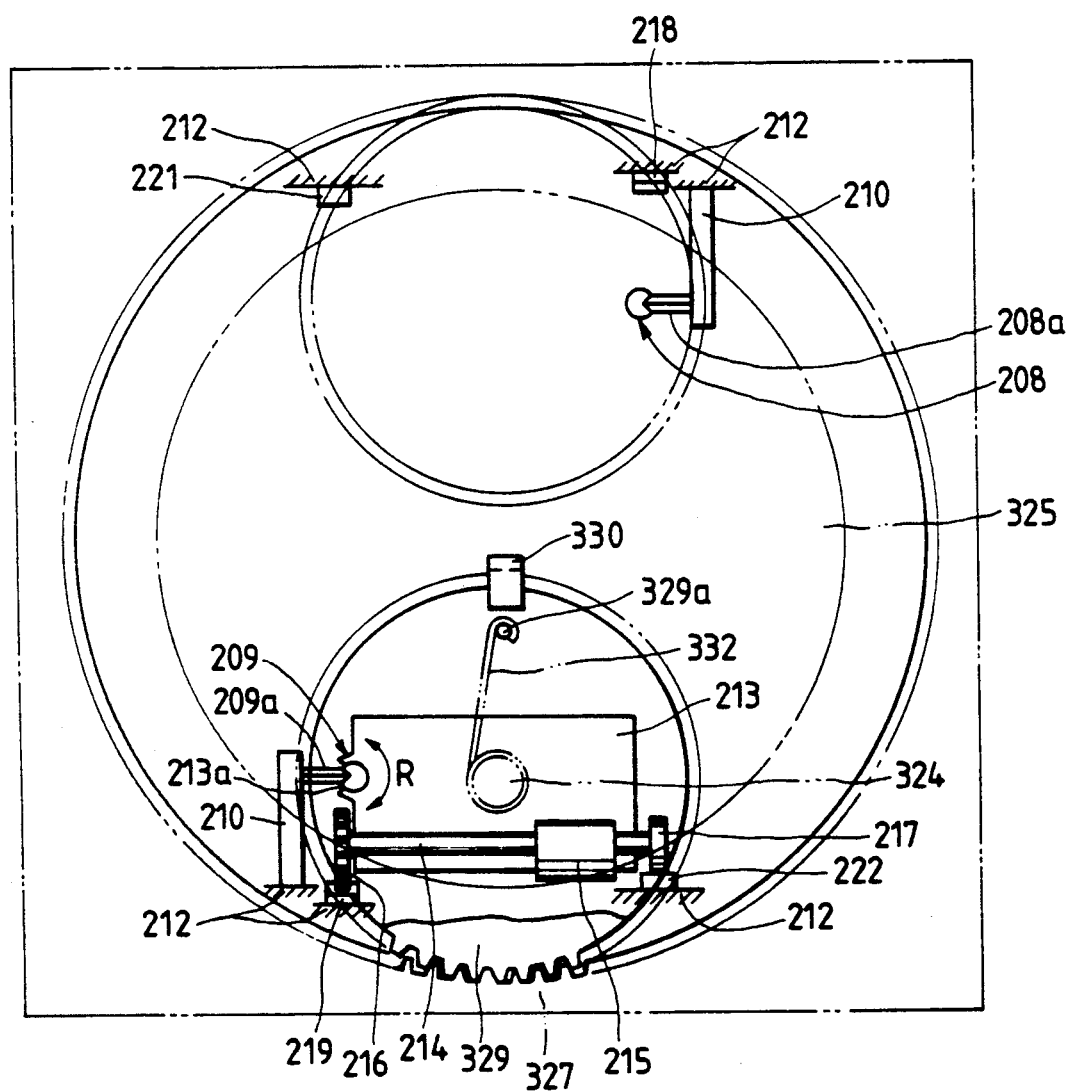
FIG. 19 is a view as seen along the line XIX—XIX of FIG. 18.

As shown in FIG. 18, when the playing of the lower recording surface of the disc 201 is finished, the carriage 213 is further moved outwardly, so that it is disengaged from the second guide member 209 and is fitted on the support pin 324 and is engaged with the flange 324a. Then, the motor 215 is rotated, and the carriage 213 is further moved outwardly, so that the support pin 324 is slidingly moved in this direction (direction of an arrow S). As a result, the support pin 324 is rotated through the one spiral groove 324c formed in the support pin 324 and the semi-spherical projection 326b formed on the boss 326 and slidably engaged in that spiral groove. On the other hand, the projection 329b of the planetary gear 329 formed at its center hole is slidably engaged in the other spiral groove 324d having the same pitch as the spiral groove 324c. Therefore, even if the support pin 324 is rotated, the planetary gear does not rotate. Therefore, in accordance with the rotation of the support pin 324, the coil spring 332 is yielded to store energy.

When the support pin 324 is rotated through a predetermined angle, the projection 329b of the planetary gear is disengaged from the spiral groove 324d and is received in the annular groove 324e. As a result, the coil spring 332 is released from its yielded condition, so that the planetary gear 329 instantaneously revolves on the sun gear 327 under the restoring force of the coil spring 332. Since the support pin 324 is engaged with the rotary member 325 together with the planetary gear 329, the rotary member 325 is rotated through 180 degrees in accordance with the revolution of the planetary gear 329. Therefore, the carriage 313 carrying the optical pickup means is moved in an inverted manner so as to correspond to the upper recording surface of the disc 201. Then the disc is driven for rotation in a direction opposite to the direction at the time of playing of the lower recording surface of the disc, so that the playing of the upper recording surface of the disc is started.

The inverting movement of the carriage 213 from the position corresponding to the upper recording surface of the disc to the position corresponding to the lower recording surface is carried out in a manner reverse to the above procedure.

In the double-sided playing disc player according to the present invention, the drive means for driving the inverting mechanism comprises the spring member which is engageable with the carriage so as to be yielded in an amount corresponding to the amount of movement of the carriage during approach of the carriage to the holder member, and releasing means for releasing the spring member from its yielded condition when the carriage is held by the holder member, the inverting mechanism being driven by a restoring force of the spring member.

More specifically, the spring member which stores energy through the movement of the carriage is released from its yielded condition simultaneously when the carriage is held by the holder member, and due to this releasing energy, the carriage is instantaneously moved in an inverted manner. Therefore, the switching time required for switching the playing from one of both recording surfaces of the disc to the other can be shortened.

What is claimed is:

1. A disc player for reproducing recorded signals from a disc, on both sides of which signals are recorded, comprising:
    a turntable disposed on a first side of said disc;
    at least one pickup is movable so as to read said first side of said disc and a second side of said disc opposite to said turntable;
    a first centering hub mounted on said turntable for centering said first side of said disc when said first side is to be reproduced;
    clamper means for clamping said disc placed on said turntable, said clamper means being disposed on said second side of said disc; and
    a second centering hub directly mounted on said clamper means for centering said second side of said disc when said second side is to be reproduced;
    wherein said turntable is mounted on a spindle, and wherein said clamper means includes a first clamper for aligning a first face of said disc in cooperation with said first centering hub and a second clamper for aligning a second face of said disc in cooperation with said second centering hub engaged with a distal end of said spindle, wherein said first and second clampers are angularly displaced.

2. The disc player of claim 1, further comprising an angularly and selectively moving means for positioning one of said first and second clampers in alignment with said first centering hub.

3. A disc player for reproducing recorded signals from a disc, on both sides of which signals are recorded, comprising:
    a turntable disposed on a first side of said disc;
    a first pickup disposed on said first side of said disc and a second pickup disposed on a second side of said disc opposite to said turntable;
    a first centering means disposed on said first side of said disc for centering said first side of said disc;
    a second centering means disposed on said second side of said disc opposite to said turntable for centering the second side of said disc; and
    a drive means for driving said second centering means, said drive means being driven by the rotation of said turntable.

4. The disc player of claim 3, wherein said turntable includes a spindle and wherein said drive means includes a cam and link means for selectively moving said second centering means in parallel with said spindle of said turntable.

* * * * *